(12) United States Patent
Janosik et al.

(10) Patent No.: US 12,506,430 B2
(45) Date of Patent: Dec. 23, 2025

(54) SYSTEMS AND METHODS FOR CURRENT SENSING IN MOTOR CONTROL APPLICATIONS

(71) Applicant: NXP USA, INC., Austin, TX (US)

(72) Inventors: Jozef Janosik, Oscadnica (SK); Marek Stulrajter, Dolny Hricov (SK); Marek Musak, Pruzina (SK)

(73) Assignee: NXP USA, Inc., Austin, TX (US)

( * ) Notice: Subject to any disclaimer, the term of this patent is extended or adjusted under 35 U.S.C. 154(b) by 254 days.

(21) Appl. No.: 18/491,896

(22) Filed: Oct. 23, 2023

(65) Prior Publication Data

US 2025/0132709 A1     Apr. 24, 2025

(51) Int. Cl.
  *H02P 21/22*   (2016.01)
  *H02P 21/18*   (2016.01)
  *H02P 21/20*   (2016.01)
  *H02P 27/12*   (2006.01)

(52) U.S. Cl.
  CPC .............. *H02P 21/22* (2016.02); *H02P 21/18* (2016.02); *H02P 21/20* (2016.02); *H02P 27/12* (2013.01)

(58) Field of Classification Search
  CPC .......... H02P 27/06; H02P 27/08; H02P 27/04; H02P 21/18; H02P 21/22; H02P 21/20; H02P 25/026; H02P 21/14; H02P 7/00; H02P 7/29; H02P 27/12; H02P 2201/13; H02P 2205/01; H03H 1/02; H02M 7/5387; H02M 1/0009; G01R 5/146; H02K 21/00
  See application file for complete search history.

(56) References Cited

U.S. PATENT DOCUMENTS

| | | | |
|---|---|---|---|
| 8,907,611 B2 | 12/2014 | Qin et al. | |
| 9,966,889 B2 | 5/2018 | Zhao et al. | |
| 2014/0333241 A1* | 11/2014 | Zhao | H02P 27/08 318/400.02 |
| 2022/0200440 A1 | 6/2022 | Lee et al. | |

FOREIGN PATENT DOCUMENTS

| | | |
|---|---|---|
| JP | 6065998 B2 | 1/2017 |
| WO | 2011003220 A1 | 1/2011 |

OTHER PUBLICATIONS

Zhendong Zhang, et al., "Industrial Inverter Current Sensing With Three Shunt Resistors: Limitations and Solutions," IEEE Transactions on Power Electronics, Jun. 2017, pp. 4577-4586, vol. 32, No. 6, publisher IEEE.
Alessio Corsaro et al: "EMC design guides for motor control applications," DocID027840 Rev 1, Jun. 1, 2015, pp. 1-51.

* cited by examiner

Primary Examiner — Antony M Paul (57) ABSTRACT

Current sensing circuits for motor control applications are discussed. In some embodiments, a circuit may include a shunt resistor network coupled to an inverter having a plurality of phase legs, where each of the plurality of phase legs is configured to drive a respective phase of an electrical motor, and an Operational Amplifier (Op Amp) coupled across the shunt resistor network, where the Op Amp enables a processor to reconstruct electrical currents in each of the plurality of phase legs.

20 Claims, 4 Drawing Sheets

SYSTEMS AND METHODS FOR CURRENT SENSING IN MOTOR CONTROL APPLICATIONS

FIELD

This disclosure relates generally to electronic circuits, and more specifically, to systems and methods for current sensing in motor control applications.

BACKGROUND

An Integrated Circuit (IC) is a set of electronic circuits fabricated on a piece of semiconductor material (e.g., silicon). With the advent of modern semiconductor manufacturing techniques, an ever-increasing number of miniaturized transistors and other electronic components may now be integrated into a single electronic package or microchip. For example, a modern System-on-Chip (SoC) may include most (or all) components of an entire computer or data processing system.

In many applications, an SoC may be used to operate another device, such as an electrical motor. Typically, a 3-phase motor uses large amounts of power. In some cases, the SoC may implement Space Vector Modulation (SVM) techniques for producing Pulse-Width Modulated (PWM) signals to drive 3-phase motors at varying speeds.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

DETAILED DESCRIPTION

In various embodiments, systems and methods for current sensing in motor control applications are described. In an illustrative, non-limiting implementation, these systems and methods may provide a triple-shunt resistor topology—e.g., in the phase legs of a 3-phase H-bridge voltage inverter with power transistors—that enables 3-phase current sensing using a single Operational Amplifier (Op Amp). Moreover, these systems and methods enable the reconstruction of all 3-phase currents based on a voltage signal provided by the Op Amp and measured across the entire triple-shunt resistor network.

Figure 1:
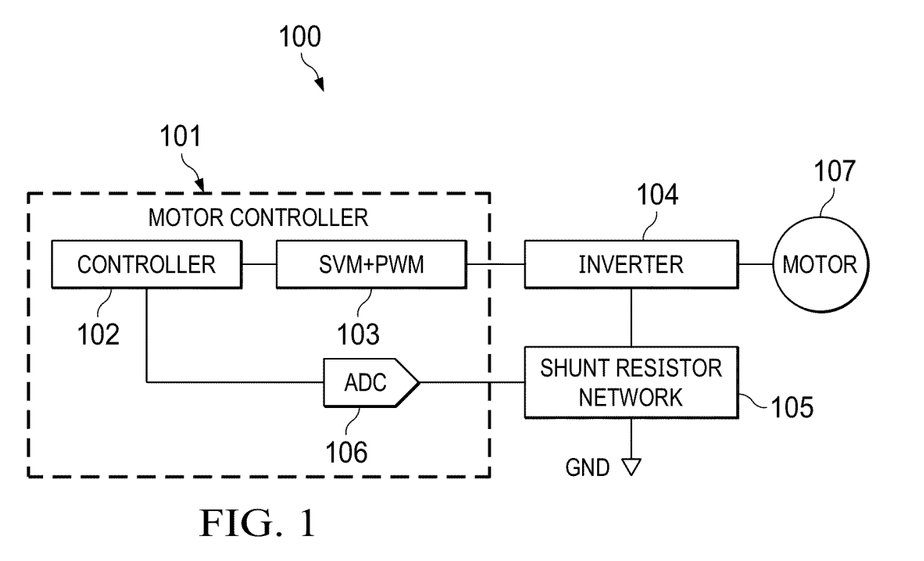
FIG. 1 is a block diagram of an example of a system for current sensing in motor control applications, according to some embodiments.

To illustrate the foregoing, FIG. 1 is a block diagram of an example of system 100 for current sensing in motor control applications. In this embodiment, system 100 includes motor controller 101 coupled to inverter 104 and to shunt resistor network 105, and inverter 104 is coupled to 3-phase motor 107.

In different applications, motor 107 may include any type of 3-phase motor, such as a 3-phase induction motor, a 3-phase synchronous motor, etc. More generally, however, motor 107 may have any number of phases (e.g., four, five, six, etc.).

Figure 2:
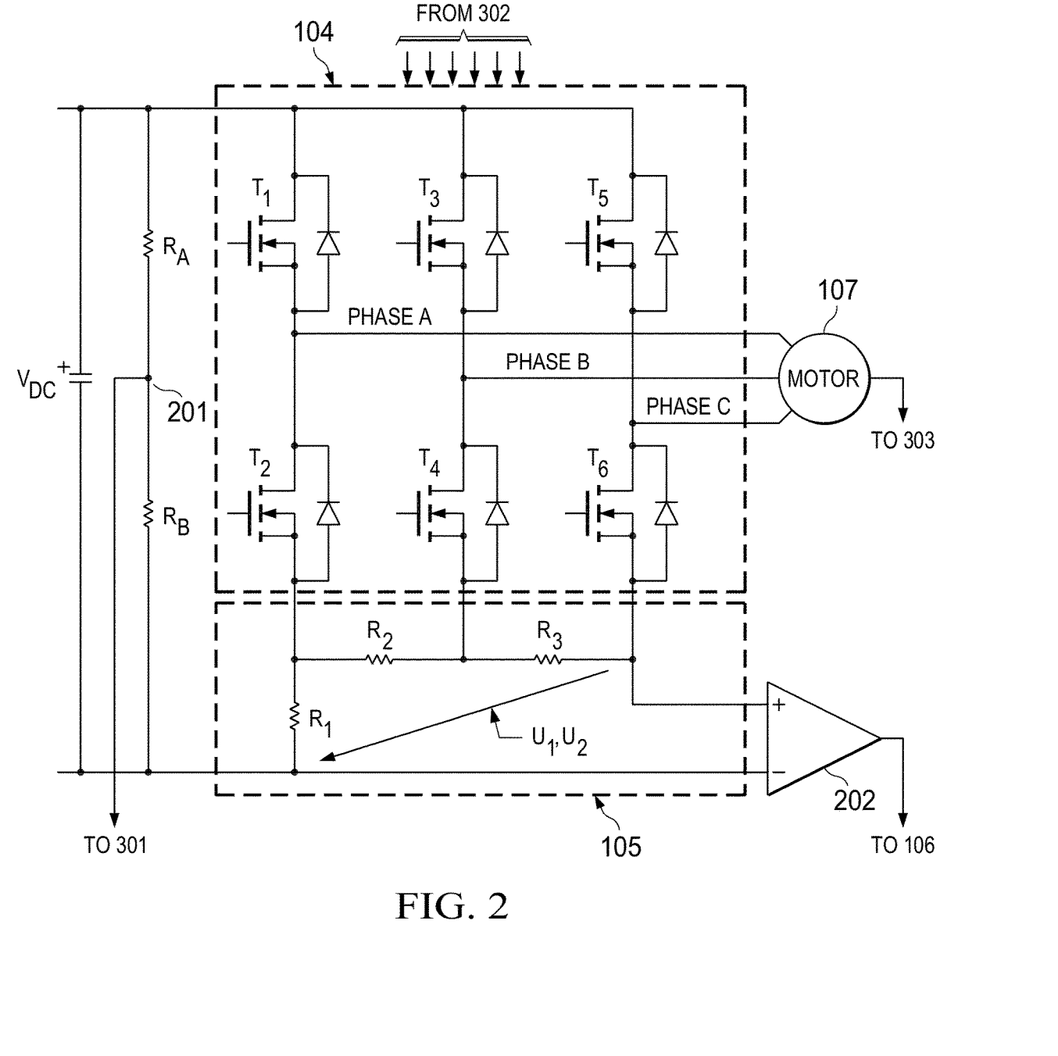
FIG. 2 is a circuit diagram of an example of an inverter and shunt resistor network, according to some embodiments.

Motor controller 101 includes controller 102, Space Vector Modulator (SVM) and Pulse Width Modulator (PWM) or "SVM+PWM" block or module 103, and Analog-to-Digital Converter (ADC) 106. Particularly, SVM provides a modulation technique for calculating a proper voltage vector, which is applied to motor 107 using PWM. Accordingly, SVM+PWM block 103 is configured to control certain aspects of the operation of power transistors ($T_1$-$T_6$) in inverter 104 (FIG. 2). Also, ADC 106 samples a voltage signal across shunt resistor network 105 (via the output of Op Amp 202).

Figure 3:
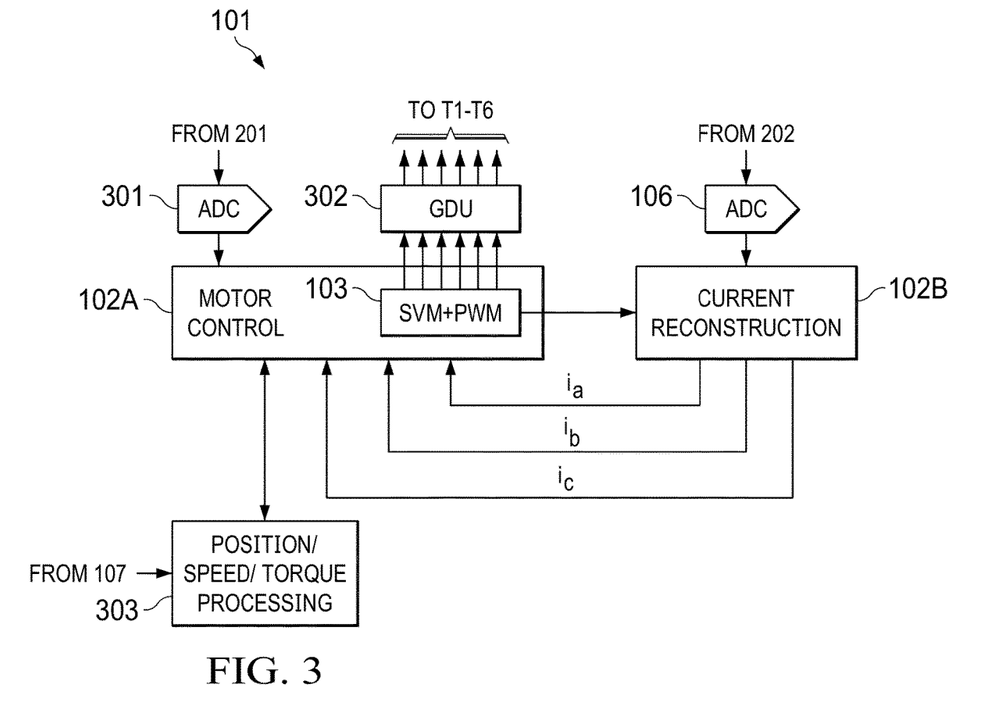
FIG. 3 is a block diagram of examples of a motor controller, according to some embodiments.

Now with reference to FIG. 2, DC bus voltage $V_{DC}$ is applied across a voltage divider including resistors $R_A$ and $R_B$. Terminal 201 is sampled by ADC 301 (FIG. 3). Inverter 104 includes a 3-phase H-bridge with power transistors $T_1$-$T_6$. Each phase leg of the H-bridge has a pair of complementary power transistors.

Transistors $T_1$-$T_6$ are controlled by PWM signals. In operation, motor controller 101 provides PWM signals to $T_1$-$T_6$ over consecutive PWM periods so as to drive motor 107 using a control algorithm executed by SVM+PWM block 103. SVM+PWM block 103 is configured to generate PWM signals to control $T_1$-$T_6$, which produce the required modulated voltage to drive motor 107 at the desired speed or torque.

Although inverter 104 is illustrated as having a particular topology, it should be noted that, in other implementations, inverter 104 may have any other suitable topology. For example, in some cases the three inverter phase legs may be mutually swapped with respect to their position within shunt resistor network 105 (provided the derived equations reflect changes in the topology).

To generate PWM signals, SVM+PWM block 103 may be configured to use a voltage vector diagram in the shape of a hexagon having 6 sectors (I-VI). Each adjacent vector pair forms one of the 6 sectors. Moreover, each vector ($V_0$-$V_7$) may correspond to a respective one of sectors I-VI, such that the boundaries of each sector I-VI are usable to control the on/off ("1" or "0") states of transistors $T_1$-$T_6$, as shown in Table 1:

TABLE I

SVM Voltage Vectors and Corresponding Transistor States

| Vector | (xyz) | T1 | T2 | T3 | T4 | T5 | T6 |
| --- | --- | --- | --- | --- | --- | --- | --- |
| V0 | (000) | 0 | 1 | 0 | 1 | 0 | 1 |
| V1 | (100) | 1 | 0 | 0 | 1 | 0 | 1 |
| V2 | (110) | 1 | 0 | 1 | 0 | 0 | 1 |
| V3 | (010) | 0 | 1 | 1 | 0 | 0 | 1 |
| V4 | (011) | 0 | 1 | 1 | 0 | 1 | 0 |
| V5 | (001) | 0 | 1 | 0 | 1 | 1 | 0 |
| V6 | (101) | 1 | 0 | 0 | 1 | 1 | 0 |
| V7 | (111) | 1 | 0 | 1 | 0 | 1 | 0 |

In Table I above, column "(xyz)" describes the on/off states of transistors $T_1$, $T_3$, and $T_5$. Transistors $T_2$, $T_4$, and $T_6$ are complementary with respect to $T_1$, $T_3$, and $T_5$, respectively.

Across any of sectors I-VI, voltage vectors ($V_0$-$V_7$) may be generated by SVM+PWM block 103 based upon commands (e.g., indicating a sector, required PWM, etc.) issued by controller 102, and those voltage vectors may be applied to $T_1$-$T_6$ to control motor 107.

To enable motor controller 101 to sense the currents flowing through each of phases A, B, and C (e.g., in order to control motor 107 using a suitable feedback control technique), inverter 104 is coupled to shunt resistor network 105, and shunt resistor network 105 is coupled to motor controller 101 via Op Amp 202.

Particularly, the topology of shunt resistor network 105 includes: first resistor $R_1$ coupled to an inverting input of Op Amp 202 and to a first phase leg ($T_1$, $T_2$) of inverter 104 (e.g., at the source terminal of $T_2$), second resistor $R_2$ coupled to the first and second phase leg ($T_3$, $T_4$) of inverter 104 (e.g., at the source terminal of $T_4$), and third resistor $R_3$ coupled to the second and third phase leg ($T_5$, $T_6$) of inverter 104 (e.g., at the source terminal of $T_6$), as shown.

In different implementations, each of $R_1$-$R_3$ may have the same resistance value, or a different value. The third phase leg of inverter 104 is coupled to a non-inverting input of Op Amp 202.

In various embodiments, this particular topology may enable systems and methods described herein to reconstruct of all 3-phase currents based upon a single voltage signal provided by Op Amp 202 and measured across entire triple-shunt resistor network 105 (i.e., as a voltage drop between $R_1$ and $R_3$).

In implementations with more than 3 phases, each additional phase (e.g., phase "N") may be provided by an additional phase leg in inverter 104, coupled to a preceding phase leg by an additional resistor (e.g., $R_N$), such that Op Amp 202 is coupled to $R_1$ and to the last resistor in shunt resistor network 105.

The output of motor 107 may be provided to position/speed/torque processing module 303, shown in FIG. 3. In some cases, the output of motor 107 may be used by processing module 303 to estimate or calculate a position, speed, or torque of motor 107 during its operation using one or more sensors coupled thereto.

FIG. 3 is a block diagram of examples of motor controller 101. In various implementations, motor controller may comprise a processor, microcontroller, Systems-On-Chip (SoC), or the like (collectively referred to as "processor").

As shown, motor controller 101 includes motor control block or portion 102A and current reconstruction module 102B (combined as "controller 102" in FIG. 1). Motor control block 102A sends commands to SVM+PWM block 103 to produce 6 control signals that are provided to Gate Driver Unit (GDU) 302, which may be external or internal with respect to controller 102. GDU 302 in turn applies each of corresponding outputs to the gates of $T_1$-$T_6$.

To control the operation of motor 107, motor control block 102A receives the output of ADC 301, which includes an indication of the voltage at terminal 201, and which along with a priori knowledge of $R_A$ and $R_B$, allow the value of DC bus voltage $V_{DC}$ to be determined. Additionally, or alternatively, to control the operation of motor 107, motor control block 102A receives the output of position/speed/torque processing module 303 based on inputs received from motor 107 or from sensors coupled thereto.

Additionally, or alternatively, to control the operation of motor 107, motor control block 102A receives, from current reconstruction module 102B: a first reconstructed current ($i_a$) for phase A, a second reconstructed current ($i_b$) for phase B, and a third reconstructed current ($i_c$) for phase C.

As used herein, the term "zero vector" refers to a voltage vector of zero magnitude translating into transistors T1-T6 on/off state as all high-side or all low-side transistors in all phase legs switched on.

Conversely, the term "active vector" refers to a voltage vector of non-zero magnitude translating into inverter transistors T1-T6 on/off state as any switching state other than zero vector (at the same time the on/off states where both of the transistors in the same phase leg are in the same state are not considered an active vector). In Table I, for example, there are six active vectors (V1-V6) and two zero vectors (V0,V7)).

The term "vector period" (of active or zero vector) refers to a portion of a PWM period during which the particular active or zero vector is generated by the inverter.

Furthermore, the term "dominant vector" (of a particular sector) refers to an active vector of a particular sector with the highest magnitude of all the active vectors generated during a particular PWM period.

To calculate reconstructed currents $i_a$-$i_c$, current reconstruction block 102B receives a signal indicative of a voltage drop across $R_1$-$R_3$ of shunt resistor network 105, as detected by Op Amp 202 and provided to ADC 106. Measurements may be performed during the active voltage vector period as well as during the zero vector period (which leads to voltage drop $u_2$), with all bottom transistors $T_2$, $T_4$, and $T_6$ turned on (i.e., using vector V0).

Measurements performed during the active voltage vector period may be used to determine voltage drop $u_1$, as described below. Conversely, measurements performed during a zero vector period may be used to determine voltage drop $u_2$.

In some cases, the zero-voltage vector V7 with high-side transistors $T_1$, $T_3$, and $T_5$ turned on (111) may not be used for current estimation purposes (the "111" vector may still be used when operating motor 107, in which case the current estimation process is placed on hold).

Figure 4:
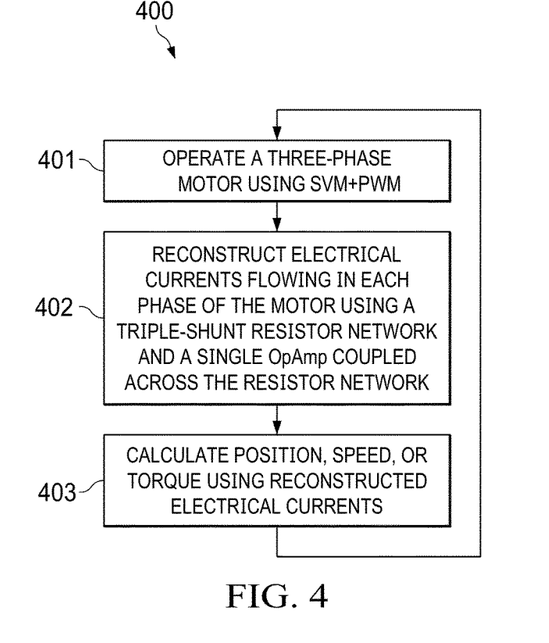
FIG. 4 is a flowchart of an example of a method for current sensing in motor control applications, according to some embodiments.

FIG. 4 is a flowchart of an example of method 400 for current sensing in motor control applications. In some embodiments, method 400 may be performed, at least in part, by motor controller 101. Particularly, at 401, motor controller 101 operates 3-phase motor 107 using SVM+PWM block 103.

At 402, motor controller 101 reconstructs electrical currents $i_a$-$i_c$ flowing in each phase of motor 107 using triple-shunt resistor network 105 and single Op Amp 202 coupled across the entire network 105.

In some cases, to reconstruct electrical currents $i_a$-$i_c$, motor controller 101 may determine voltage drop $u_2$ across shunt resistor network 105 at each zero vector. Motor controller 101 may also determine voltage drop $u_1$ across shunt resistor network 105 during each of a plurality of active vector periods.

In various embodiments, unlike $u_1$, $u_2$ may be modeled by a different equation in each of the plurality of active vector periods. Each of the plurality of active vector periods may include the concurrent application of two voltage vectors to the electric motor, and there may be six active vector periods at each rotation of motor 107. Accordingly, to reconstruct electrical currents $i_a$-$i_c$, motor controller 101 may be configured to solve a different system of equations for each of the plurality of active vector periods, as described in more detail below.

At 403, motor controller 101 may calculate a position, speed, and torque of motor 107, at least in part, based upon the reconstructed electrical currents $i_a$-$i_c$ using any suitable technique before control returns to 401.

To enable current reconstruction block 102B to perform 3-phase current signal reconstruction based on a single voltage signal across shunt resistor network 105, current reconstruction module 102B may be configured to detect a dominant vector based at least in part upon the duty cycles/switching states generated by SPM+PWM module 103, and, in response thereto, perform a number of operations.

For example, current reconstruction module 102B may be configured to determine voltage drop $u_1$ across shunt resistor network 105, where $u_1$ represents a unique analog value for each voltage vector applied to motor 107. There are 6 active vectors in inverter 104, and each of these vectors leads to a unique voltage drop $u_1$.

Based upon the assumptions that: (1) currents flowing to motor 107 are positive, currents flowing from motor 107 are negative; and (2) the system is symmetrical system such that: $i_a + i_b + i_c = 0$, the following equations for voltage drop $u_1$ and for any particular active voltage vector may be derived:

<u>Vector 100</u>: $u_1 = (R_1 + R_2)i_a - R_3 i_c$

<u>Vector 011</u>: $u_1 = -R_1 i_a$

<u>Vector 110</u>: $u_1 = -(R_1 + R_2 + R_3)i_c$

<u>Vector 001</u>: $u_1 = R_2(i_a + i_c) + R_1 i_c$

<u>Vector 010</u>: $u_1 = -R_1(i_a + i_c) - (R_2 + R_3)i_c$

<u>Vector 101</u>: $u_1 = (R_1 + R_2)(i_a - i_c)$

Current reconstruction module 102B may also be configured to determine second voltage drop $u_2$ across shunt resistor network 105 at zero vector: $u_2 = R_2 i_a - R_3 i_c$. This equation remains the same for zero vector 000 throughout all 6 sectors. (The current flow through resistors $R_2$ and $R_3$ may vary with an active vector preceding the Zero Vector, but by applying the foregoing assumptions and Kirchhoff's 2nd law, the equation remains unchanged.)

Current reconstruction equations for respective SVM sectors are determined based on $u_1$ and $u_2$. In each SVM sector, the voltage is composed of zero vectors and two active vectors. Currents $i_a$, $i_b$, and $i_c$ are reconstructed from: (i) $u_1$ measured during the dominant active vector period, and (ii) $u_2$ measured during zero voltage period—i.e., when T2, T4, and T6 are on.

Moreover, the forementioned assumptions yield a set of 3 equations with 3 unknowns. By solving the relevant equations for each individual sector, the 3-phase motor currents for the individual sector may be reconstructed:

Sector I a) Dominant Vector 110:

$$\begin{cases} i_c = -\dfrac{u_1}{R_1 + R_2 + R_3} \\ i_a = \dfrac{R_3}{R_2} i_c + \dfrac{u_2}{R_2} \end{cases}$$

b) Dominant Vector 100:

$$\begin{cases} i_a = \dfrac{u_1 - u_2}{R_1} \\ i_c = \dfrac{R_2}{R_3} i_a - \dfrac{u_2}{R_3} \end{cases}$$

Sector II a) Dominant Vector 110:

$$\begin{cases} i_c = -\dfrac{u_1}{R_1 + R_2 + R_3} \\ i_a = \dfrac{R_3}{R_2} i_c + \dfrac{u_2}{R_2} \end{cases}$$

b) Dominant Vector 010:

$$\begin{cases} i_a = \dfrac{u_1}{-R_1 - \dfrac{R_2}{R_3}(R_1 + R_2 + R_3)} - \dfrac{u_2 \dfrac{R_1 + R_2 + R_3}{R_3}}{-R_1 - \dfrac{R_2}{R_3}(R_1 + R_2 + R_3)} \\ i_c = \dfrac{R_2}{R_3} i_a - \dfrac{u_2}{R_3} \end{cases}$$

Sector III a) Dominant Vector 011:

$$\begin{cases} i_a = -\dfrac{u_1}{R_1} \\ i_c = \dfrac{R_2}{R_3} i_a - \dfrac{u_2}{R_3} \end{cases}$$

b) Dominant Vector 010:

$$\begin{cases} i_a = \dfrac{u_1}{-R_1 - \dfrac{R_2}{R_3}(R_1 + R_2 + R_3)} - \dfrac{u_2 \dfrac{R_1 + R_2 + R_3}{R_3}}{-R_1 - \dfrac{R_2}{R_3}(R_1 + R_2 + R_3)} \\ i_c = \dfrac{R_2}{R_3} i_a - \dfrac{u_2}{R_3} \end{cases}$$

Sector IV a) Dominant Vector 011:

$$\begin{cases} i_a = -\dfrac{u_1}{R_1} \\ i_c = \dfrac{R_2}{R_3} i_a - \dfrac{u_2}{R_3} \end{cases}$$

b) Dominant Vector 001:

$$\begin{cases} i_c = \dfrac{u_1 - u_2}{R_1 + R_2 + R_3} \\ i_a = \dfrac{R_3}{R_2} i_c + \dfrac{u_2}{R_2} \end{cases}$$

Sector V a) Dominant Vector 101:

$$\begin{cases} i_a = \dfrac{u_1}{R_1 + R_2 + \dfrac{R_2}{R_3}(R_1 + R_2)} + \dfrac{u_2 \dfrac{R_1 + R_2}{R_3}}{R_1 + R_2 + \dfrac{R_2}{R_3}(R_1 + R_2)} \\ i_c = \dfrac{R_2}{R_3} i_a - \dfrac{u_2}{R_3} \end{cases}$$

b) Dominant Vector 001:

$$\begin{cases} i_c = \dfrac{u_1 - u_2}{R_1 + R_2 + R_3} \\ i_a = \dfrac{R_3}{R_2} i_c + \dfrac{u_2}{R_2} \end{cases}$$

Sector VI a) Dominant Vector 101:

$$\begin{cases} i_a = \dfrac{u_1}{R_1 + R_2 + \dfrac{R_2}{R_3}(R_1 + R_2)} + \dfrac{u_2 \dfrac{R_1 + R_2}{R_3}}{R_1 + R_2 + \dfrac{R_2}{R_3}(R_1 + R_2)} \\ i_c = \dfrac{R_2}{R_3} i_a - \dfrac{u_2}{R_3} \end{cases}$$

b) Dominant Vector 100:

$$\begin{cases} i_a = \dfrac{u_1 - u_2}{R_1} \\ i_c = \dfrac{R_2}{R_3} i_a - \dfrac{u_2}{R_3} \end{cases}$$

As such, systems and methods described herein provide topologies for a shunt resistor network coupled to a single Op Amp to measure each 3-phase inverter/motor current $i_a$, $i_b$, and $i_c$. In various embodiments, these systems and methods may be used in motor control applications where a single shunt resistor configuration (e.g., in the DC link) is not desirable or possible (e.g., due to customer preference, application preference, etc.), therefore three shunt resistors must be used yet the deployment of three external Op Amps would be design or cost prohibitive.

In an illustrative, non-limiting embodiment, a circuit may include a shunt resistor network coupled to an inverter having a plurality of phase legs, where each of the plurality of phase legs is configured to drive a respective phase of an electrical motor, and an Op Amp coupled across the shunt resistor network, where the Op Amp enables a processor to reconstruct electrical currents in each of the plurality of phase legs.

The electrical motor may include a 3-phase electrical motor, where the plurality of phase legs includes three phase legs, and where the shunt resistor network includes three shunt resistors.

A first shunt resistor may be coupled between a terminal and a first phase leg of the plurality of legs, a second shunt may be is coupled between the first phase leg and a second phase leg of the plurality of legs, and a third shunt resistor may be coupled between the second phase leg and a third phase leg of the plurality of legs.

A non-inverting input of the Op Amp may be coupled to the third phase leg, an inverting input of the Op Amp is coupled to the terminal, and an output of the Op Amp is coupled to an input of an Analog-to-Digital Converter (ADC).

To reconstruct the electrical currents, the processor may be configured to determine a voltage drop across the shunt resistor network at a zero vector. Additionally, or alternatively, to reconstruct the electrical currents, the processor is configured to determine a voltage drop across the shunt resistor network during each of a plurality of active vector periods.

The second voltage drop may be modeled by a different equation in each of the plurality of active vector periods. Each of the plurality of active vector periods may include the concurrent application of two voltage vectors to the electric motor, and there may be six active vector periods at each rotation of the electric motor.

Additionally, or alternatively, to reconstruct the electrical currents, the processor may be configured to solve a different system of equations for each of the plurality of active vector periods. The processor may also be configured to determine a position, a speed, or a torque of the electrical motor based, at least in part, upon the reconstructed electrical currents.

In another illustrative, non-limiting embodiment, an electronic device, may include a processor and a memory coupled to the processor, the memory having program instructions stored thereon that, upon execution, cause the device to: control a 3-phase motor; and determine electrical currents in each of the three phases using: (i) a shunt resistor network comprising a resistor for each phase, and (ii) an Op Amp coupled across the shunt resistor network, where a first resistor is coupled between a terminal and a first phase leg of an inverter, a second resistor is coupled between the first phase leg and a second phase leg of the inverter, and a third resistor is coupled between the second phase leg and a third phase leg of the inverter.

The Op Amp may be coupled between the terminal and the third phase leg.

The program instructions, upon execution, may cause the device to control the 3-phase motor using SVM. Additionally, or alternatively, the program instructions, upon execution, may cause the device to control the 3-phase motor using PWM.

To determine the electrical currents, the processor may be configured to determine a voltage drop across the shunt resistor network at a zero vector. Additionally, or alternatively, to determine the electrical currents, the processor is configured to determine a voltage drop across the shunt resistor network during each of a plurality of active vector periods.

In yet another illustrative, non-limiting embodiment, a method may include operating a 3-phase motor using an SVM+PWM module and reconstructing an electrical current flowing in each of the three phases of the motor using a triple-shunt resistor network and a single Op Amp coupled across the triple-shunt resistor network. The single Op Amp may be coupled to an ADC, and the ADC may be coupled to a processor configured to reconstruct the electrical currents.

In some cases, reconstructing the electrical currents may include determining a first voltage drop across the triple-shunt resistor network at a zero vector, and a second voltage drop across the triple-shunt resistor network during each of a plurality of active vector periods. The method may also include determining a position, a speed, or a torque of the 3-phase motor, at least in part, based upon the reconstructed electrical currents.

In many implementations, systems and methods described herein may be incorporated into a wide range of electronic devices including, for example, computer systems or Information Technology (IT) products; consumer devices or appliances; scientific instrumentation; industrial robotics; medical or laboratory electronics; transportation vehicles such as automobiles, buses, trucks, trains, watercraft, aircraft, etc.; military equipment, etc. More generally, these systems and methods may be incorporated into any device, product, or system having one or more electric motors subject to motor control.

For sake of brevity, conventional techniques have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A circuit, comprising:
   a shunt resistor network coupled to an inverter having a plurality of phase legs, wherein each of the plurality of phase legs is configured to drive a respective phase of an electrical motor; and
   an Operational Amplifier (Op Amp) coupled across the shunt resistor network, wherein the Op Amp enables a processor to reconstruct electrical currents in each of the plurality of phase legs.

2. The circuit of claim 1, wherein the electrical motor comprises a 3-phase electrical motor, wherein the plurality of phase legs comprises three phase legs, and wherein the shunt resistor network comprises three shunt resistors.

3. The circuit of claim 2, wherein a first shunt resistor is coupled between a terminal and a first phase leg of the plurality of legs, a second shunt resistor is coupled between the first phase leg and a second phase leg of the plurality of legs, and a third shunt resistor is coupled between the second phase leg and a third phase leg of the plurality of legs.

4. The circuit of claim 3, wherein a non-inverting input of the Op Amp is coupled to the third phase leg, wherein an inverting input of the Op Amp is coupled to the terminal, wherein an output of the Op Amp is coupled to an input of an Analog-to-Digital Converter (ADC).

5. The circuit of claim 1, wherein to reconstruct the electrical currents, the processor is configured to determine a voltage drop across the shunt resistor network at a zero vector.

6. The circuit of claim 5, wherein to reconstruct the electrical currents, the processor is configured to determine a voltage drop across the shunt resistor network during each of a plurality of active vector periods.

7. The circuit of claim 6, wherein the second voltage drop is modeled by a different equation in each of the plurality of active vector periods.

8. The circuit of claim 6, wherein each of the plurality of active vector periods comprises the concurrent application of two voltage vectors to the electric motor, and wherein there are six active vector periods at each rotation of the electric motor.

9. The circuit of claim 6, wherein to reconstruct the electrical currents, the processor is configured to solve a different system of equations for each of the plurality of active vector periods.

10. The circuit of claim 1, wherein the processor is configured to determine a position, a speed, or a torque of the electrical motor based, at least in part, upon the reconstructed electrical currents.

11. An electronic device, comprising:
    a processor; and
    a memory coupled to the processor, the memory having program instructions stored thereon that, upon execution, cause the electronic device to:
    control a 3-phase motor; and
    determine electrical currents in each of the three phases using: (i) a shunt resistor network, and (ii) an Operational Amplifier (Op Amp) coupled across the shunt resistor network, wherein a first resistor is coupled between a terminal and a first phase leg of an inverter, a second resistor is coupled between the first phase leg and a second phase leg of the inverter, and a third resistor is coupled between the second phase leg and a third phase leg of the inverter.

12. The electronic device of claim 11, wherein the Op Amp is coupled between the terminal and the third phase leg.

13. The electronic device of claim 11, wherein the program instructions, upon execution, cause the electronic device to control the 3-phase motor, at least in part, using Space Vector Modulation (SVM).

14. The electronic device of claim 11, wherein the program instructions, upon execution, cause the electronic device to control the 3-phase motor, at least in part, using Pulse Width Modulation (PWM).

15. The electronic device of claim 11, wherein to determine the electrical currents, the processor is configured to determine a voltage drop across the shunt resistor network at a zero vector.

16. The electronic device of claim 15, wherein to determine the electrical currents, the processor is configured to determine a voltage drop across the shunt resistor network during each of a plurality of active vector periods.

17. A method comprising:
operating a 3-phase motor using Space Vector Modulation (SVM) and Pulse-Width Modulation (PWM); and
reconstructing an electrical current flowing in each of the three phases of the motor using a triple-shunt resistor network and a single Operational Amplifier (Op Amp) coupled across the triple-shunt resistor network.

18. The method of claim 17, wherein the single Op Amp is coupled to an Analog-to-Digital Converter (ADC), and wherein the ADC is coupled to a processor configured to reconstruct the electrical currents.

19. The method of claim 17, wherein reconstructing the electrical currents comprises determining a first voltage drop across the triple-shunt resistor network at a zero vector, and a second voltage drop across the triple-shunt resistor network during each of a plurality of active vector periods.

20. The method of claim 17, further comprising determining a position, a speed, or a torque of the 3-phase motor, at least in part, based upon the reconstructed electrical currents.

* * * * *